United States Patent
Aniket et al.

(10) Patent No.: US 9,752,388 B2
(45) Date of Patent: Sep. 5, 2017

(54) ESTIMATING CASING WEAR DUE TO DRILL STRING RECIPROCATION

(71) Applicant: Landmark Graphics Corporation, Houston, TX (US)

(72) Inventors: Aniket, Houston, TX (US); Adolfo Gonzales, Houston, TX (US); Robello Samuel, Cypress, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 0 days.

(21) Appl. No.: 14/917,398

(22) PCT Filed: Jun. 12, 2015

(86) PCT No.: PCT/US2015/035460
§ 371 (c)(1),
(2) Date: Mar. 8, 2016

(87) PCT Pub. No.: WO2016/200395
PCT Pub. Date: Dec. 15, 2016

(65) Prior Publication Data
US 2017/0159371 A1    Jun. 8, 2017

(51) Int. Cl.
*E21B 12/02* (2006.01)
*E21B 49/00* (2006.01)
(Continued)

(52) U.S. Cl.
CPC .......... *E21B 12/02* (2013.01); *E21B 41/0092* (2013.01); *G06F 17/5009* (2013.01); *G06F 2217/16* (2013.01)

(58) Field of Classification Search
CPC .... E21B 12/02; E21B 41/0092; E21B 49/005; E21B 29/06; E21B 17/1085; G06F 17/5009; G06F 2217/16
(Continued)

(56) References Cited

U.S. PATENT DOCUMENTS

| 4,573,540 A | 3/1986 | Dellinger et al. |
| 5,578,820 A | 11/1996 | Gadeken et al. |

(Continued)

FOREIGN PATENT DOCUMENTS

| WO | 2014209282 A1 | 12/2014 |
| WO | 2015002653 A1 | 1/2015 |

OTHER PUBLICATIONS

Hall et al., Recent Advances in Casing Wear Technology, IADC/SPE Drilling Conference, Dallas, Texas, 1994, IADC/SPE 27532.

(Continued)

*Primary Examiner* — Michael Wills, III
(74) *Attorney, Agent, or Firm* — McDermott Will & Emery LLP

(57) ABSTRACT

Estimating casing wear during a reciprocation portion of a drilling operation may take into account the forces that cause casing wear during the up and down strokes independently. For example, during a drilling operation, a method may include reciprocating the drill string through the wellbore for a plurality of up strokes and a plurality of down strokes according to reciprocation parameters; calculating an up stroke normal force and a down stroke normal force for the casing or a section thereof; calculating up and down stroke casing wears based on the up and down stroke normal forces, respectively, using a reciprocation casing wear model; calculating a reciprocation casing wear based on the up and down stroke casing wears; and calculating a total casing wear for the casing or the section thereof based on the reciprocation casing wear using a total casing wear model.

20 Claims, 4 Drawing Sheets

(51) Int. Cl.
*G06F 17/50* (2006.01)
*E21B 41/00* (2006.01)

(58) Field of Classification Search
USPC .......................................................... 175/40
See application file for complete search history.

(56) References Cited

U.S. PATENT DOCUMENTS

| | | | |
|---|---|---|---|
| 8,862,436 | B2 | 10/2014 | Samuel |
| 9,605,526 | B2 * | 3/2017 | Samuel ................... E21B 44/00 |
| 2010/0037675 | A1 | 2/2010 | Hannahs et al. |
| 2014/0214326 | A1 | 7/2014 | Samuel et al. |
| 2015/0176401 | A1 * | 6/2015 | Samuel ................... E21B 44/00 |
| | | | 702/6 |
| 2016/0119591 | A1 * | 4/2016 | Samuel ................. E21B 21/066 |
| | | | 175/24 |
| 2016/0230528 | A1 * | 8/2016 | Samuel ................... E21B 12/02 |
| 2017/0022798 | A1 * | 1/2017 | Samuel ............... E21B 47/0006 |

OTHER PUBLICATIONS

International Search Report and Written Opinion for PCT/US2015/035460 dated Feb. 5, 2016.

* cited by examiner

ESTIMATING CASING WEAR DUE TO DRILL STRING RECIPROCATION

BACKGROUND

The embodiments described herein relate to estimating casing wear in the oil and gas industry.

Wellbores in the oil and gas industry are typically drilled in stages. Once a stage is drilled, it is often lined with a casing to provide wellbore wall stability to mitigate collapse and blowouts as additional stages are drilled. Because of this staged drilling and casing method, subsequent stages further from the surface typically exhibit a decrease in wellbore diameter.

When drilling below cased portions of the wellbore, the casing may wear due to contact with the drill string. Drilling involves not only drilling into new portions of the formation, but also reciprocation operations where the drill bit is moved up and down newly drilled portions of the wellbore (sometimes referred to as "stages") to smooth the wellbore surface and provide a uniform wellbore diameter. As the drill string is reciprocated, the drill string proximal to the casing uphole of the drill bit cause wear on the casing.

Casing wear results in a decrease in casing thickness, which, in turn, weakens the casing. In order to avoid casing collapse or blowouts, it is advantageous to know the degree of wear that has taken place so that remedial actions may be taken when the casing thickness has sufficiently reduced. For these reasons, it is valuable to be able to determine the thickness of the casing at any given point.

The casing thickness may be determined spectroscopically by, for example, gamma rays tools. Such tools may be used after drilling the wellbore via a wireline operation to assess the casing thickness. However, this provides only a final assessment of the casing and does not allow for analysis of the casing thickness or integrity during the drilling operation itself.

To investigate casing thickness during drilling, such analysis tools may be placed along the drill string. However, the analysis tool can only assess the casing within a few feet along the wellbore relative to the analysis tool's current location. Accordingly, this does not provide an accurate assessment of the casing along the entire length of the wellbore.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The embodiments described herein relate to estimating casing wear during drilling operations when a drill string is reciprocated within a wellbore. Further, the embodiments described take into account the forces that cause casing wear during the up and down strokes independently.

A drill string may include one or more of the following components: drill pipes, transition pipes (also known as "heavy weight drill pipes"), bottom hole assemblies (which may include, for example, drill collars, drill stabilizers, downhole motors, rotary steerable systems, measure-while-drilling tools, and logging-while-drilling tools), drill pipe protectors (which have reduced wear compared to the drill pipe), and the like, each of which may cause wear to the casing when the drill string is moved rotationally within and/or axially along the wellbore. During a reciprocation operation, a drill string is pulled toward the surface of a wellbore (i.e., up) and then subsequently pushed toward the bottom of the wellbore (i.e., down) to the initial positon of a drill bit coupled to an end of the drill string. Reciprocation operations may occur as a part of a drilling operation, a sliding operation, or the like. Reciprocation operations may occur several times during a drilling operation, for example, after individual stages of the wellbore are drilled.

Figure 1:
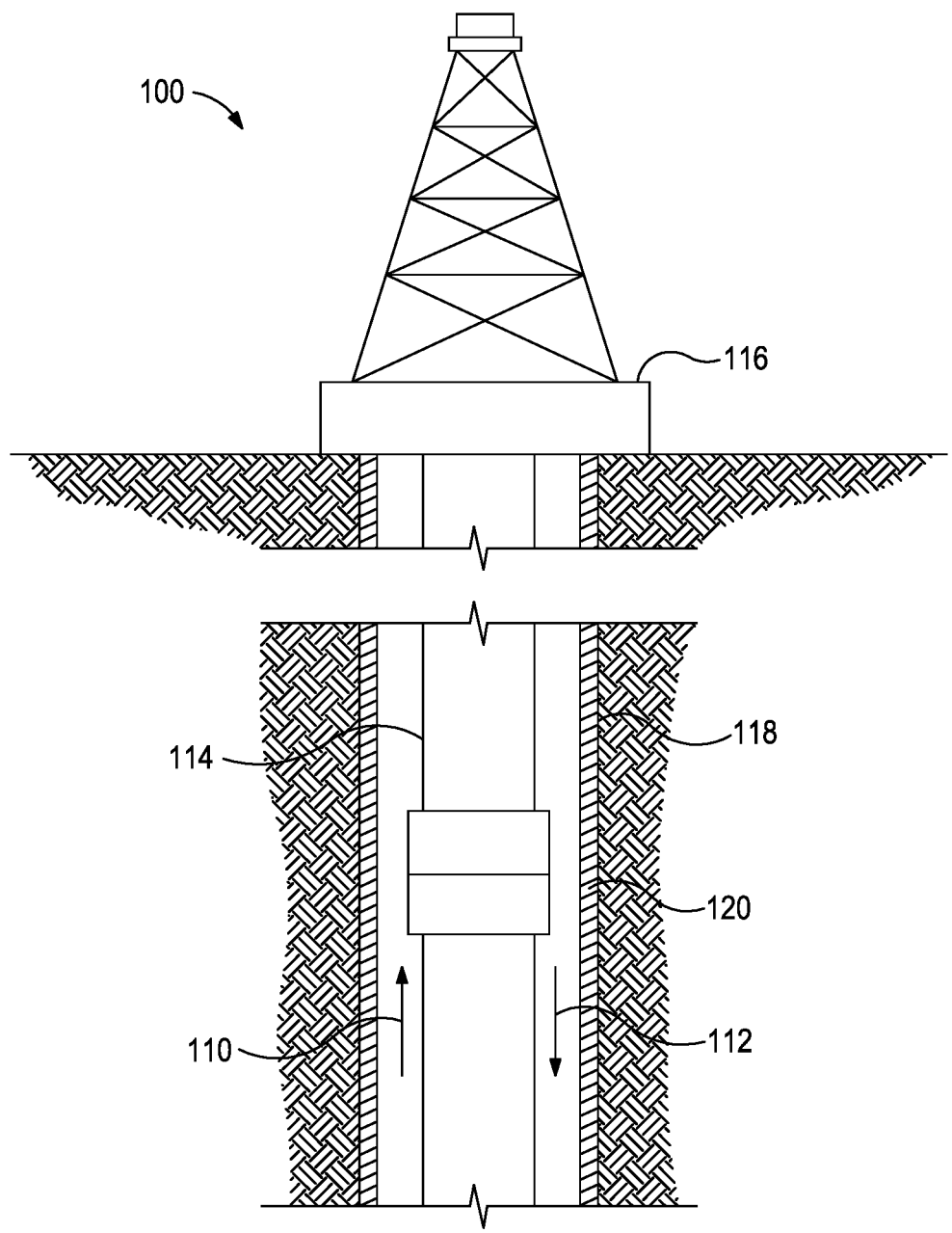
FIG. 1 illustrates an exemplary up and down strokes of a drill string in a portion of a drilling system, according to one or more embodiments.

FIG. 1 schematically illustrates exemplary up and down strokes 110,112 of a drill string 114 in a portion of a drilling system 100, according to one or more embodiments. In the analyses described herein, the term "stroke" refers to a single up cycle or a single down cycle of the drill string in a reciprocation operation. The up stroke 110 occurs as the drill string 114 is conveyed uphole in a wellbore 118, which is illustrated as being lined with a casing 120, toward a drilling platform 116 or otherwise toward the earth's surface. The down stroke 112 occurs as the drill string 114 is conveyed downhole away from the drilling platform 116.

Typically, a reciprocation operation involves several strokes. During a stroke, the drill string may be rotated so as to rotate the drill bit, which is referred to herein as a "drilling stroke." In some instances, the drill string may be reciprocated without rotation, which is referred to as a "sliding stroke."

Figure 2:
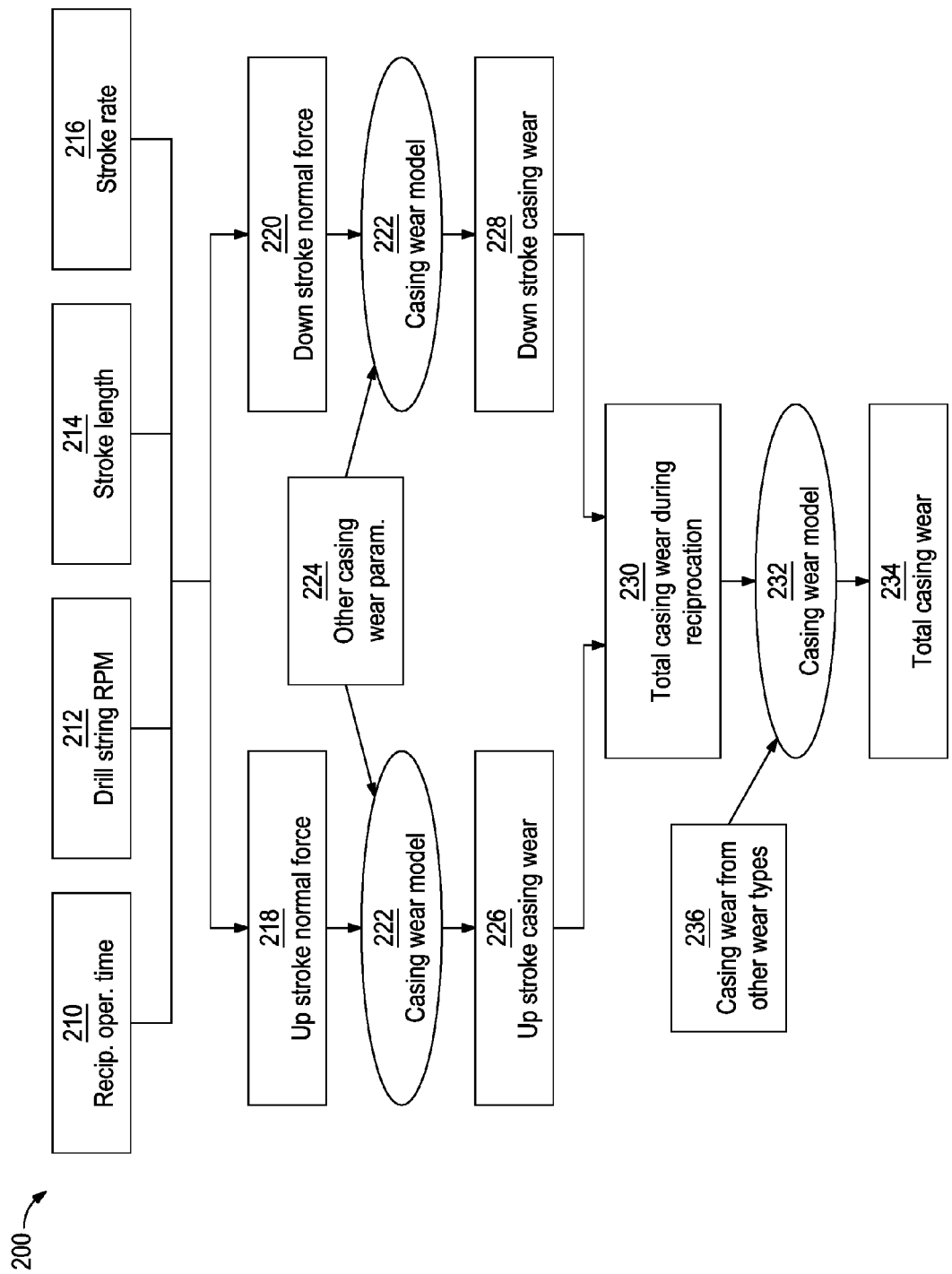
FIG. 2 provides a diagram of an exemplary analysis described herein for estimating casing wear during reciprocation operations.

FIG. 2 provides a schematic flowchart for analytical method 200 of estimating casing wear during reciprocation operations, according to one or more embodiments. The analytical method 200 may be performed using a control system described herein.

As illustrated, the method 200 has four inputs: reciprocation operation time 210, drill string revolutions per minute 212 (which may be 0 when the drill string is not rotated), stroke length 214, and stroke rate 216. Based on these four inputs, a normal contact force acting on a casing due to drill string contact with the casing may be calculated for both of the up stroke (i.e., an up stroke normal force 218) and the down stroke (i.e., a down stroke normal force 220). By calculating the up and down stroke contact forces 218,120 with the four inputs 210,212,214,216, the effect of the axial velocity of the drill string and the rotational speed of the drill string are both taken into account. Additionally, because the up and down stroke contact forces 218,220 are different, calculating both provides for a more accurate analysis 200. The up and down stroke contact forces 218,220 may be calculated by conventional methods, which may include, but are not limited to, a soft string model, a stiff string model, a finite element model, or the like.

The up and down stroke contact forces 218,220 are then applied to a reciprocation casing wear model 222, optionally along with other casing wear parameters 224, like wear factors and a contact distance per stroke. Wear factors relate a particular force applied to the amount of wear a drill string may cause to a casing. Wear factors take into account the physical and material properties of the drill string, the casing, and the drilling fluid. In many instances, the wear factors may be based on experimental data.

The contact distance per stroke accounts for the contact distance between the drill string and the casing due to both rotational (where applicable) and axial movement during each stroke. The contact distance per stroke may be estimated according to Equation 1 below, where AD is the axial distance traversed (or the stroke length) and RD is the rotation distance of the drill string. The rotational distance may be estimated according to Equation 2 below, where d is the drill string diameter, rpm is the revolutions per minute of the drill string during the stroke, and t is the operation time during the stroke.

$$\text{contact distance per stroke} = \sqrt{AD^2 + RD^2} \qquad \text{Equation 1}$$

$$RD = \pi * d * rpm * t \qquad \text{Equation 2}$$

The reciprocation casing wear model 222 estimates the casing wear during the up stroke (up stroke casing wear 226) and the down stroke (down stroke casing wear 228). A total casing wear during the reciprocation operation 230 may then be estimated based on a combination of the up and down stroke casing wears 226,228. The total casing wear during the reciprocation operation 230 may then be used as an input for a total casing wear model 232 that estimates total casing wear 234 due to a plurality of wear types, which may include, in addition to the total casing wear during the reciprocation operation 230, for example, drilling casing wear (i.e., casing wear caused by the drill string during drilling), tripping casing wear (i.e., casing wear caused by the drill string when pulling the drill string out of the wellbore, which is often performed to replace or repair the drill bit, portions of the drill string, or tools coupled to the drill string), backreaming casing wear (i.e., casing wear caused by the drill string when stroking and rotating the drill string while simultaneously pulling out of the hole, which is often performed during the initial steps of tripping a drill string from a deviated wellbore or when increasing the gauge of the wellbore), rotating off bottom casing wear (i.e., casing wear caused by the drill string when the drill string is rotated at a without reciprocation), non-drilling casing wear (e.g., in off-shore well sites, sea heave may cause the platform to move and, consequently, axial motion of the drill string along the wellbore), sliding casing wear (e.g., casing wear caused by the drill string when the drill string is not rotated but the drill bit coupled thereto is rotated with a mud motor), and the like. The total casing wear model 232 may, in some instances, be a summation of the total casing wear during the reciprocation operation 230 and the casing wear from other wear types 236.

The total casing wear during the reciprocation operation 230 and the total casing wear 234 may be expressed as a volume of casing worn away (also referred to as "casing wear volume"), a percentage of casing worn away (also referred to herein as "casing wear percentage"), a thickness of casing remaining, a percentage of casing remaining, or a combination thereof.

The total casing wear during the reciprocation operation 230 and the total casing wear 234 may be calculated/estimated for the entire casing or for sections thereof. The total casing wear 234 may then be used to determine if there has been sufficient casing wear of the casing or sections thereof to potentially compromise the integrity of the casing or a section thereof. This may be done by one of many methods. For example, the casing or sections thereof may have a threshold casing wear that is set based on the physical and material properties of the casing. In another example, the total casing wear 234 may be used to estimate a thickness of the casing or sections thereof that should be used in the well to prevent any failures based on known calculations taking into account the physical and material properties of the casing. In another example, the drilling operation parameters including parameters related to the reciprocation operation may be adjusted to keep the total casing wear 234 below a predetermined threshold wear that mitigates casing failure.

The reciprocation casing wear model 222, the total casing wear model 232, and the calculations or models relating to the method 200 or related analyses described herein may be stored on and executed with one or more control systems described herein.

The analyses described herein may, in some embodiments, be used during a drilling operation. For example, the total casing wear 234 based at least in part on the total casing wear during the reciprocation operation 230 may be calculated while drilling a wellbore penetrating a subterranean formation. The total casing wear 234 may be analyzed continuously while drilling, after a predetermined depth is drilled, on-demand, or any combination thereof.

If the casing wear for the casing or sections thereof indicates that the integrity of the casing may be compromised, a remedial action may be taken. For example, the casing or sections thereof may be reinforced with liners, screens, or the like. In another example, the drilling operation parameters including parameters related to the reciprocation operation may be adjusted to reduce the amount of casing wear and mitigate casing failure.

Figure 3:
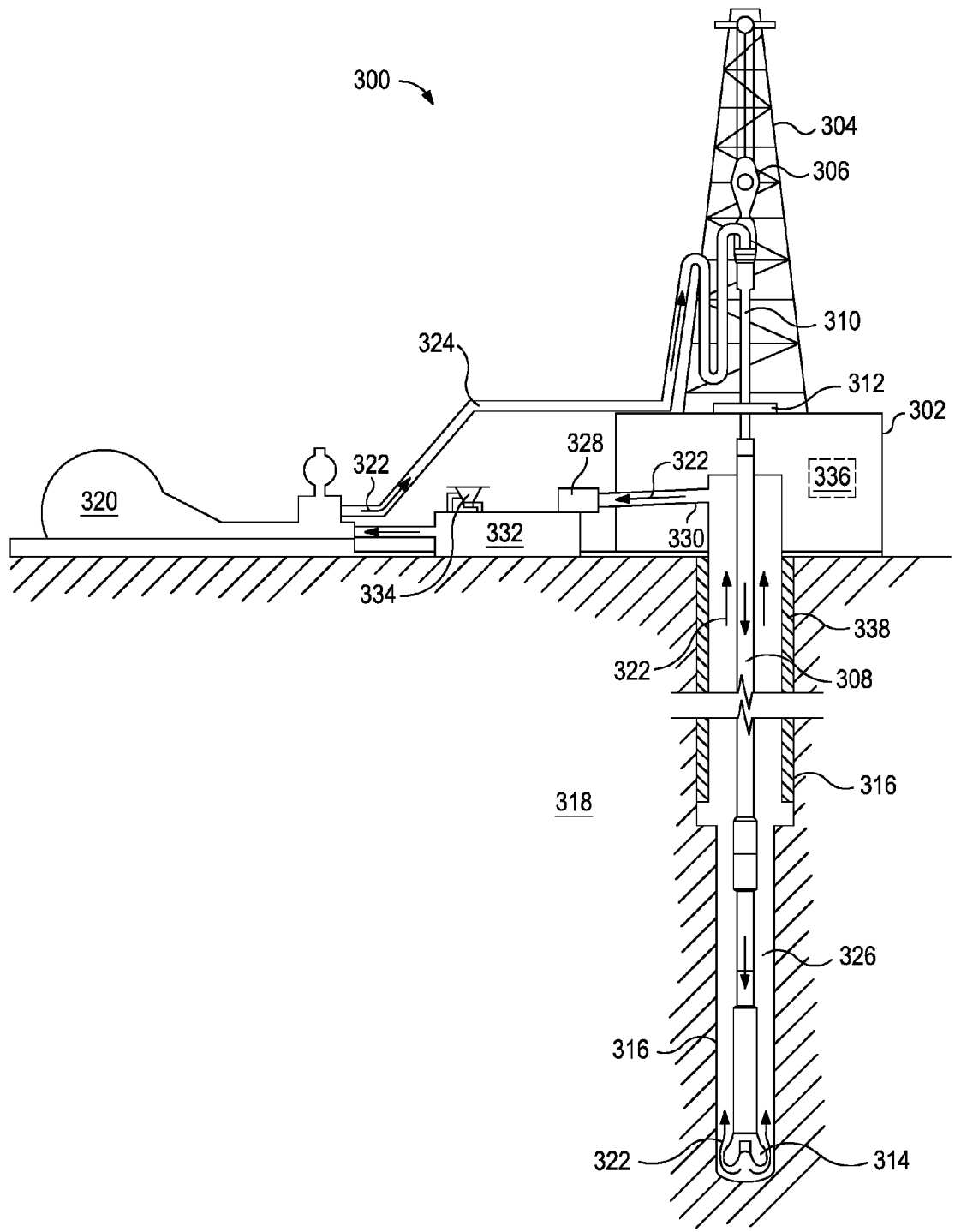
FIG. 3 illustrates an exemplary wellbore drilling assembly suitable for implementing the analyses described herein, according to one or more embodiments.

FIG. 3 illustrates an exemplary wellbore drilling assembly 300 suitable for implementing the analyses described herein, according to one or more embodiments. It should be noted that while FIG. 3 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 300 may include a drilling platform 302 that supports a derrick 304 having a traveling block 306 for raising and lowering a drill string 308. The drill string 308 may include one or more of the following components: drill pipes, transition pipes (also known as "heavy weight drill pipes"), bottom hole assemblies (which may include, for example, drill collars, drill stabilizers, downhole motors, rotary steerable systems, measure-while-drilling tools, and logging-while-drilling tools), and the like. A kelly 310 supports the drill string 308 as it is lowered through a rotary table 312. A drill bit 314 is attached to the distal end of the drill string 308 and is driven either by a downhole motor and/or via rotation of the drill string 308 from the well surface. As the bit 314 rotates, it creates a wellbore 316 that penetrates various subterranean formations 318. As illustrated, the wellbore 316 is partially lined with casing 338. The wear for casing 338 or sections thereof may be evaluated according to the analyses described herein.

A pump 320 (e.g., a mud pump) circulates drilling fluid 322 through a feed pipe 324 and to the kelly 310, which conveys the drilling fluid 322 downhole through the interior of the drill string 308 and through one or more orifices in the drill bit 314. The drilling fluid 322 is then circulated back to the surface via an annulus 326 defined between the drill string 308 and the walls of the wellbore 316. At the surface, the recirculated or spent drilling fluid 322 exits the annulus 326 and may be conveyed to one or more fluid processing unit(s) 328 via an interconnecting flow line 330. After passing through the fluid processing unit(s) 328, a "cleaned" drilling fluid 322 is deposited into a nearby retention pit 332 (i.e., a mud pit). While illustrated as being arranged at the outlet of the wellbore 316 via the annulus 326, those skilled in the art will readily appreciate that the fluid processing unit(s) 328 may be arranged at any other location in the drilling assembly 300 to facilitate its proper function, without departing from the scope of the disclosure.

Additives may be added to the drilling fluid 322 via a mixing hopper 334 communicably coupled to or otherwise in fluid communication with the retention pit 332. The mixing hopper 334 may include, but is not limited to, mixers and related mixing equipment known to those skilled in the art. In other embodiments, however, the additives may be added to the drilling fluid 322 at any other location in the drilling assembly 300. In at least one embodiment, for example, there could be more than one retention pit 332, such as multiple retention pits 332 in series. Moreover, the retention pit 332 may be representative of one or more fluid storage facilities and/or units where the additives may be stored, reconditioned, and/or regulated until added to the drilling fluid 322.

The drilling assembly 300 may further include a control system 336 that may, inter alia, perform the analyses described herein.

The analyses described herein may, in some embodiments, be used when designing a drilling operation. For example, when a drilling operation is simulated (e.g., using mathematical models stored and executed on a control system), the total casing wear including casing wear due to reciprocation operations may be analyzed. If, during the simulation, the total casing wear for the casing or sections thereof indicates that the integrity may be compromised, the drilling operation design may be altered to mitigate casing wear. For example, drill string sections that cause less wear may be substituted for drill string sections being modeled. In another example, the casing or portions thereof may be replaced with a casing that can withstand greater wear. In another example, the drilling operation parameters including parameters related to the reciprocation operation may be adjusted to reduce the amount of casing wear and mitigate casing failure. A combination of the foregoing may also be implemented.

The control system(s) 336 (e.g., used at a drill site or in simulating a drilling operation) and corresponding computer hardware used to implement the various illustrative blocks, modules, elements, components, methods, and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable programmable read only memory (EPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

For example, the control system(s) 336 described herein may be configured for receiving inputs, which may be real or simulated data, that may include, but are not limited to, the four inputs relating to the reciprocation analyses described herein, the configuration of the drill string (e.g., the length and/or composition of each drill string section, the ordering thereof, and the like), the wear factors corresponding to the drill string or the casing, the configuration of the casing (e.g., the depth and diameter of the casing), the depth of the drill bit (e.g., which may be used to track the location of each drill string section relative to casing sections), and the like. The processor may also be configured to perform the analyses described herein that estimate casing wear during reciprocation operations and/or estimate total casing wear. The output may be a numerical value indicative of casing wear, a pictorial representation of casing wear (e.g., a graph or a color-coded figure that correlates casing wear to locations along the wellbore), or the like. In some instances, the processor may also be configured to alert an operator (e.g., at the drill site or running the drilling simulation) that the casing wear indicates that the integrity of the casing or sections thereof may be compromised.

Embodiments disclosed herein include:

Embodiment A: a method that includes drilling a wellbore penetrating a subterranean formation with a drill bit coupled to an end of a drill string extending into the wellbore, wherein a portion of the wellbore is lined with casing; reciprocating the drill string through the wellbore for a plurality of up strokes and a plurality of down strokes according to reciprocation parameters that include a reciprocation operation time, a drill string revolutions per minute (rpm), a stroke length for the plurality of up and down strokes, and a stroke rate for the plurality of up and down strokes; calculating an up stroke normal force and a down stroke normal force for the casing or a section thereof based on the reciprocation parameters using a soft string model, a stiff string model, a finite element model; calculating an up stroke casing wear based on the up stroke normal force using a reciprocation casing wear model; calculating a down stroke casing wear based on the down stroke normal force using the reciprocation casing wear model; calculating a reciprocation casing wear based on the up and down stroke casing wears; and calculating a total casing wear for the casing or the section thereof based on the reciprocation casing wear using a total casing wear model;

Embodiment B: a method that includes simulating a drilling operation with a mathematical model of drilling a wellbore penetrating a subterranean formation with a drill bit coupled to an end of a drill string extending into the wellbore, wherein a portion of the wellbore is lined with casing, the mathematical model being stored in a non-transitory medium readable by a processor for execution by the processor; reciprocating the drill string through the wellbore for a plurality of up strokes and a plurality of down strokes according to reciprocation parameters that include a reciprocation operation time, a drill string revolutions per minute (rpm), a stroke length for the plurality of up and down strokes, and a stroke rate for the plurality of up and down strokes; calculating an up stroke normal force and a down stroke normal force for the casing or a section thereof based on the reciprocation parameters using a soft string model, a stiff string model, a finite element model; calculating an up stroke casing wear based on the up stroke normal force using a reciprocation casing wear model; calculating a down stroke casing wear based on the down stroke normal force using the reciprocation casing wear model; calculating a reciprocation casing wear based on the up and down stroke casing wears; calculating a total casing wear for the casing or the section thereof based on the reciprocation casing wear using a total casing wear model; assigning a threshold value for the total casing wear for the casing or the section thereof; and changing at least one parameter of the drilling operation when the total casing wear exceeds the threshold value;

Embodiment C: a drilling system that includes a drill bit coupled to an end of a drill string extending into a wellbore, wherein a portion of the wellbore is lined with casing; a pump operably connected to the drill string for circulating a drilling fluid through the wellbore; a control system that includes a non-transitory medium readable by a processor and storing instructions for execution by the processor for performing a method comprising: receiving reciprocation parameters related to reciprocating the drill string through the wellbore for the plurality of up strokes and the plurality of down strokes, reciprocation parameters including a reciprocation operation time, a drill string revolutions per minute (rpm), a stroke length for the plurality of up and down strokes, and a stroke rate for the plurality of up and down strokes; calculating an up stroke normal force and a down stroke normal force for the casing or a section thereof based on the reciprocation parameters using a soft string model, a stiff string model, a finite element model; calculating an up stroke casing wear based on the up stroke normal force using a reciprocation casing wear model; calculating a down stroke casing wear based on the down stroke normal force using the reciprocation casing wear model; calculating a total casing wear during the reciprocating based on the up and down stroke casing wears; and calculating a total casing wear for the casing or the section thereof based on the reciprocation casing wear using a total casing wear model; and Embodiment D: a non-transitory medium readable by a processor and storing instructions for execution by the processor for performing a method comprising: receiving reciprocation parameters related to reciprocating the drill string through the wellbore for the plurality of up strokes and the plurality of down strokes, reciprocation parameters including a reciprocation operation time, a drill string revolutions per minute (rpm), a stroke length for the plurality of up and down strokes, and a stroke rate for the plurality of up and down strokes; calculating an up stroke normal force and a down stroke normal force for the casing or a section thereof based on the reciprocation parameters using a soft string model, a stiff string model, a finite element model; calculating an up stroke casing wear based on the up stroke normal force using a reciprocation casing wear model; calculating a down stroke casing wear based on the down stroke normal force using the reciprocation casing wear model; calculating a total casing wear during the reciprocating based on the up and down stroke casing wears; and calculating a total casing wear for the casing or the section thereof based on the reciprocation casing wear using a total casing wear model.

Each of embodiments A, B, and C may have one or more of the following additional elements in any combination: Element 1: wherein the up and down stroke casing wears are further based on a wear factor based on physical and material properties of the drill string; Element 2: wherein the up and down stroke casing wears are further based on a wear factor based on physical and material properties of the casing or the section thereof; Element 3: wherein the up and down stroke casing wears are further based on a wear factor based on physical and material properties of a drilling fluid contained in the wellbore; Element 4: wherein the up and down stroke casing wears are further based on a contact distance per stroke according to Equation 1; Element 5: wherein calculating the total casing wear is further based on a drilling casing wear caused by the drill string during drilling; Element 6: the method further comprising tripping (or simulating tripping) the drill string through the wellbore, wherein calculating the total casing wear is further based on a tripping casing wear caused by the drill string during a tripping operation; Element 7: the method further comprising rotating (or simulating rotating) the drill string without axially moving the drill string along the wellbore, wherein calculating the total casing wear is further based on a rotating off bottom casing wear caused by the drill string rotating the drill string without axially moving; Element 8: the method further comprising assigning a threshold value for the total casing wear for the casing or the section thereof; and performing a remedial operation on the casing or the section thereof when the total casing wear exceeds the threshold value; Element 9: the method further comprising Element 8 and changing at least one parameter of the drilling operation when the total casing wear exceeds the threshold value; Element 10: Element 9 and wherein the at least one parameter of the drilling operation is a composition of the casing or the section thereof; and Element 11: Element 9 and wherein the at least one parameter of the drilling operation is a composition of the drill string or a section thereof.

By way of non-limiting example, exemplary combinations applicable to A, B, C include: two or more of Elements 1-3 in combination; two or more of Elements 5-7 in combination; Elements 8 and 9 in combination with Elements 10 and 11; one or more of Elements 1-3 in combination with one or more of Elements 5-7 and optionally further in combination with Element 4; one or more of Elements 1-3 in combination with one or more of Elements 8-11 and optionally further in combination with Element 4; one or more of Elements 5-7 in combination with one or more of Elements 8-11 and optionally further in combination with Element 4; Element 4 in combination with one or more of Elements 1-3 and optionally further in combination with one or more of Elements 5-11; and ; Element 4 in combination with one or more of Elements 5-11.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Figure 4:
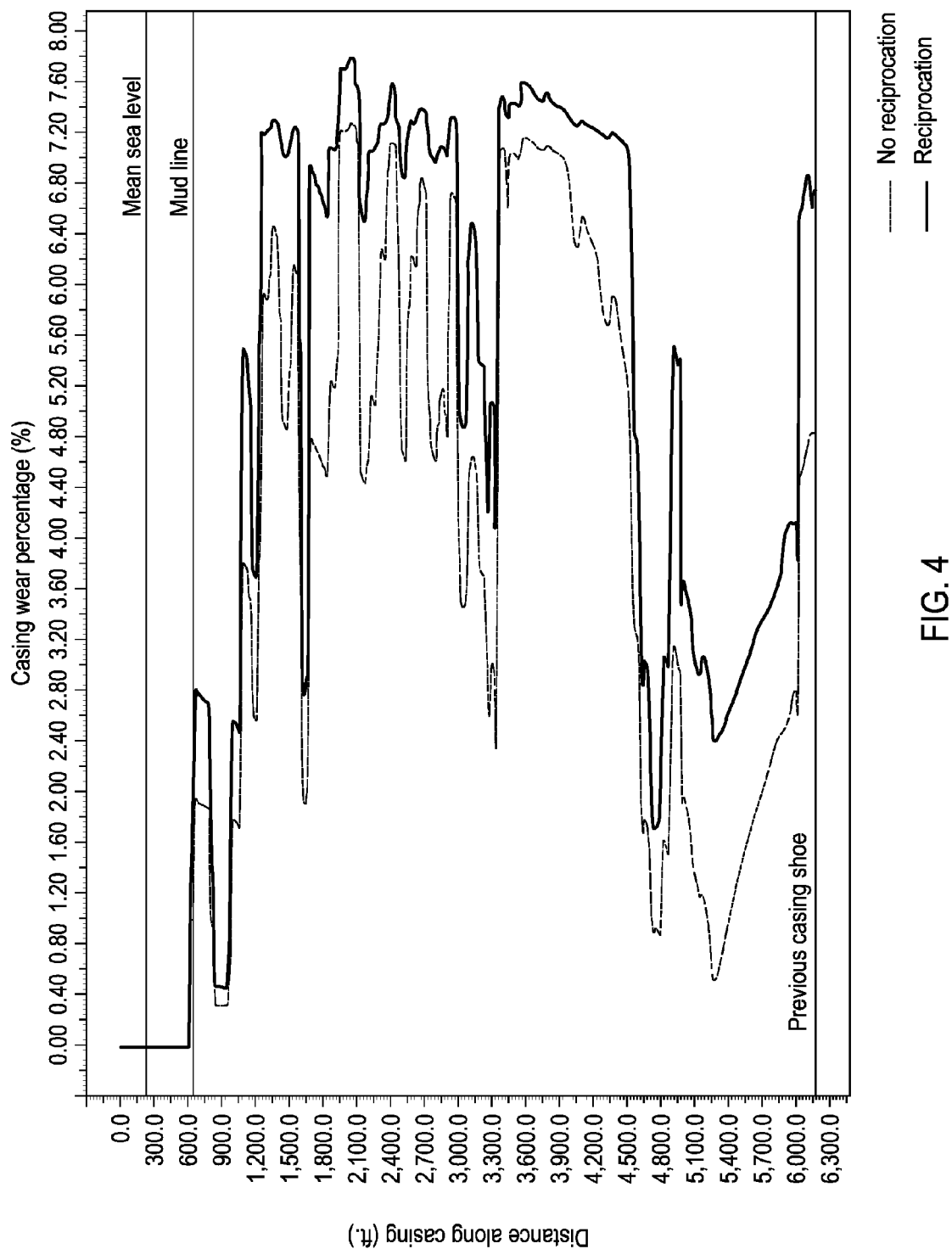
FIG. 4 provides the total casing wear where casing wear due to reciprocation is considered and not considered.

Using a total casing wear model and a drilling simulation model, the total casing wear was calculated twice. In the first calculation, casing wear from drilling was only considered. In the second calculation, casing wear from both the drilling and reciprocation were considered. FIG. 4 provides the total casing wear where casing wear due to reciprocation is considered and not considered. As illustrated, when casing wear due to reciprocation is considered, the total casing wear is higher. In some instances, the total casing wear is about 2% greater (e.g., at about 4500 ft downhole). This example provides for only a single reciprocation operation. As described herein, a drilling operation may involve several reciprocation operations (e.g., after individual stages of the wellbore are drilled).

Accordingly, the 2% change illustrated here would compound and be a significant component of total casing wear. This example illustrates that considering casing wear due to reciprocation in the analyses described herein provide a more accurate measure of total casing wear, which may advantageously be used in preventing wellbore collapse and blowouts.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein.

Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   drilling a wellbore penetrating a subterranean formation with a drill bit coupled to an end of a drill string extending into the wellbore, wherein a portion of the wellbore is lined with casing;
   reciprocating the drill string within the wellbore for a plurality of up strokes and a plurality of down strokes according to reciprocation parameters that include a reciprocation operation time, a drill string revolutions per minute (rpm), a stroke length for the plurality of up and down strokes, and a stroke rate for the plurality of up and down strokes;
   calculating an up stroke normal force and a down stroke normal force for the casing or a section thereof based on the reciprocation parameters using a soft string model, a stiff string model, a finite element model;
   calculating an up stroke casing wear based on the up stroke normal force using a reciprocation casing wear model;
   calculating a down stroke casing wear based on the down stroke normal force using the reciprocation casing wear model;
   calculating a reciprocation casing wear based on the up and down stroke casing wears; and
   calculating a total casing wear for the casing or the section thereof based on the reciprocation casing wear using a total casing wear model.

2. The method of claim 1, wherein the up and down stroke casing wears are further based on a wear factor based on physical and material properties of the drill string.

3. The method of claim 1, wherein the up and down stroke casing wears are further based on a wear factor based on physical and material properties of the casing or the section thereof.

4. The method of claim 1, wherein the up and down stroke casing wears are further based on a wear factor based on physical and material properties of a drilling fluid contained in the wellbore.

5. The method of claim 1, wherein the up and down stroke casing wears are further based on a contact distance per stroke according to Equation 1, where AD is the stroke length and RD is a rotational distance of the drill string $$\text{contact distance per stroke} = \sqrt{AD^2 + RD^2} \qquad \text{Equation 1,}$$

6. The method of claim 1, wherein calculating the total casing wear is further based on a drilling casing wear caused by the drill string during drilling.

7. The method of claim 1 further comprising:
tripping the drill string through the wellbore, wherein calculating the total casing wear is further based on a tripping casing wear caused by the drill string during a tripping operation.

8. The method of claim 1 further comprising:
rotating the drill string without axially moving the drill string along the wellbore, wherein calculating the total casing wear is further based on a rotating off bottom casing wear caused by the drill string rotating the drill string without axially moving.

9. The method of claim 1 further comprising:
assigning a threshold value for the total casing wear for the casing or the section thereof; and
performing a remedial operation on the casing or the section thereof when the total casing wear exceeds the threshold value.

10. A method comprising:
simulating a drilling operation with a mathematical model of drilling a wellbore with a drill bit coupled to an end of a drill string extending into the wellbore, wherein a portion of the wellbore is lined with casing, the mathematical model being stored in a non-transitory medium readable by a processor for execution by the processor;
reciprocating the drill string through the wellbore for a plurality of up strokes and a plurality of down strokes according to reciprocation parameters that include a reciprocation operation time, a drill string revolutions per minute (rpm), a stroke length for the plurality of up and down strokes, and a stroke rate for the plurality of up and down strokes;
calculating an up stroke normal force and a down stroke normal force for the casing or a section thereof based on the reciprocation parameters using a soft string model, a stiff string model, a finite element model;
calculating an up stroke casing wear based on the up stroke normal force using a reciprocation casing wear model;
calculating a down stroke casing wear based on the down stroke normal force using the reciprocation casing wear model;
calculating a reciprocation casing wear based on the up and down stroke casing wears;
calculating a total casing wear for the casing or the section thereof based on the reciprocation casing wear using a total casing wear model;
assigning a threshold value for the total casing wear for the casing or the section thereof; and
changing at least one parameter of the drilling operation when the total casing wear exceeds the threshold value.

11. The method of claim 10, wherein the at least one parameter of the drilling operation is a composition of the casing or the section thereof.

12. The method of claim 10, wherein the at least one parameter of the drilling operation is a composition of the drill string or a section thereof.

13. The method of claim 10, wherein the up and down stroke casing wears are further based on a wear factor based on physical and material properties of the drill string.

14. The method of claim 10, wherein the up and down stroke casing wears are further based on a wear factor based on physical and material properties of the casing or the section thereof.

15. The method of claim 10, wherein the up and down stroke casing wears are further based on a wear factor based on physical and material properties of a drilling fluid contained in the wellbore.

16. The method of claim 10, wherein the up and down stroke casing wears are further based on a contact distance per stroke according to Equation 1, where AD is the stroke length and RD is the rotational distance of the drill string $$\text{contact distance per stroke} = \sqrt{AD^2 + RD^2} \qquad \text{Equation 1.}$$

17. The method of claim 10, wherein calculating the total casing wear is further based on a drilling casing wear caused by the drill string during drilling.

18. The method of claim 10 further comprising:
rotating the drill string without axially moving the drill string along the wellbore, wherein calculating the total casing wear is further based on a rotating off bottom casing wear caused by the drill string rotating the drill string without axially moving.

19. A drilling system comprising:
a drill bit coupled to an end of a drill string extending into a wellbore, wherein a portion of the wellbore is lined with casing;
a pump operably connected to the drill string for circulating a drilling fluid through the wellbore;
a control system that includes a non-transitory medium readable by a processor and storing instructions for execution by the processor for performing a method comprising:
receiving reciprocation parameters related to reciprocating the drill string within the wellbore for a plurality of up strokes and a plurality of down strokes, the reciprocation parameters including a reciprocation operation time, a drill string revolutions per minute (rpm), a stroke length for the plurality of up and down strokes, and a stroke rate for the plurality of up and down strokes;
calculating an up stroke normal force and a down stroke normal force for the casing or a section thereof based on the reciprocation parameters using a soft string model, a stiff string model, a finite element model;
calculating an up stroke casing wear based on the up stroke normal force using a reciprocation casing wear model;
calculating a down stroke casing wear based on the down stroke normal force using the reciprocation casing wear model;
calculating a total casing wear during the reciprocating based on the up and down stroke casing wears; and
calculating a total casing wear for the casing or the section thereof based on the reciprocation casing wear using a total casing wear model.

20. A non-transitory medium readable by a processor and storing instructions for execution by the processor for performing a method comprising:

receiving reciprocation parameters related to reciprocating a drill string through a wellbore lined with casing for a plurality of up strokes and a plurality of down strokes, the reciprocation parameters including a reciprocation operation time, a drill string revolutions per minute (rpm), a stroke length for the plurality of up and down strokes, and a stroke rate for the plurality of up and down strokes;

calculating an up stroke normal force and a down stroke normal force for the casing or a section thereof based on the reciprocation parameters using a soft string model, a stiff string model, a finite element model;

calculating an up stroke casing wear based on the up stroke normal force using a reciprocation casing wear model;

calculating a down stroke casing wear based on the down stroke normal force using the reciprocation casing wear model;

calculating a total casing wear during the reciprocating based on the up and down stroke casing wears; and calculating a total casing wear for the casing or the section thereof based on the reciprocation casing wear using a total casing wear model.

* * * * *